March 29, 1966 R. M. FRANZEL 3,243,192
AUTOMATIC STABILITY CONTROL FOR GROUND VEHICLES
Filed Sept. 23, 1963 3 Sheets-Sheet 3

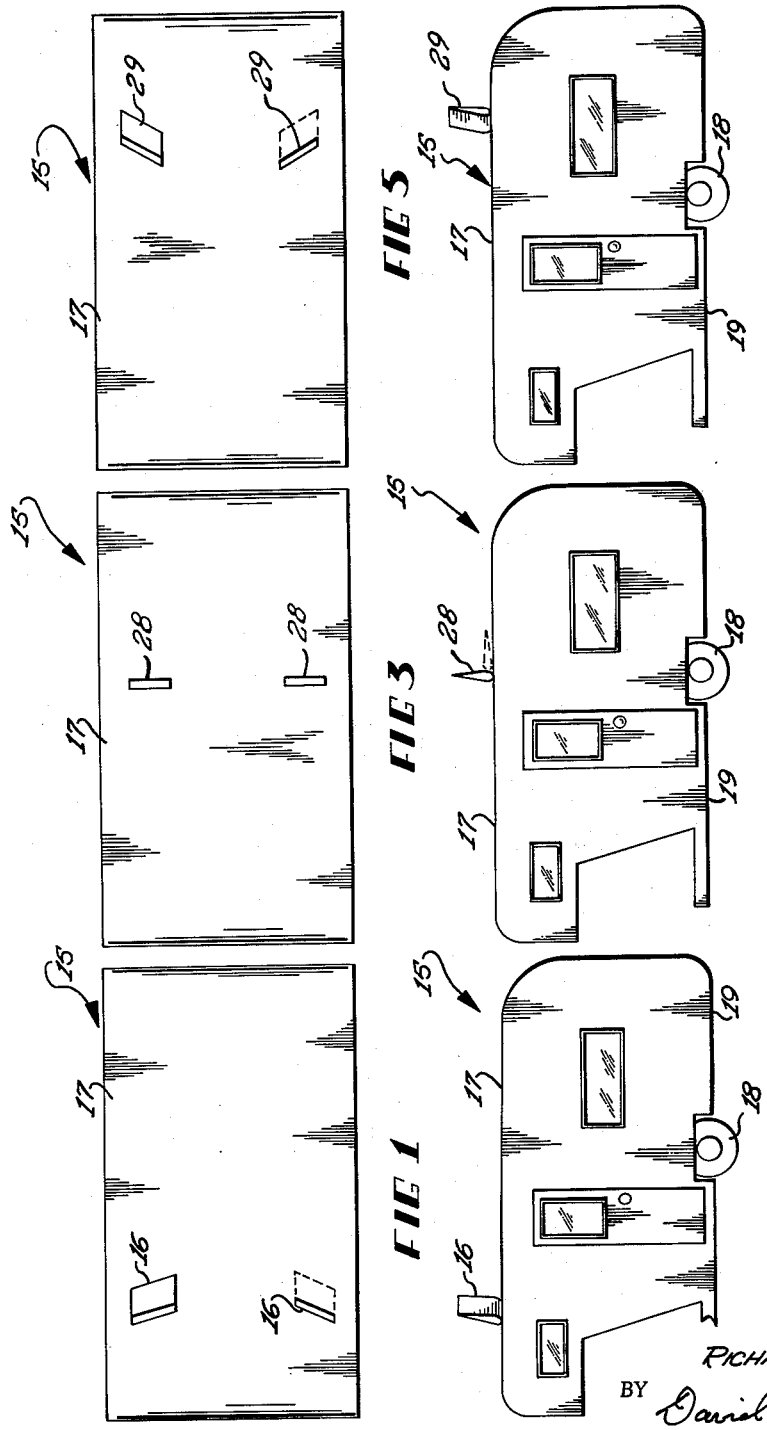

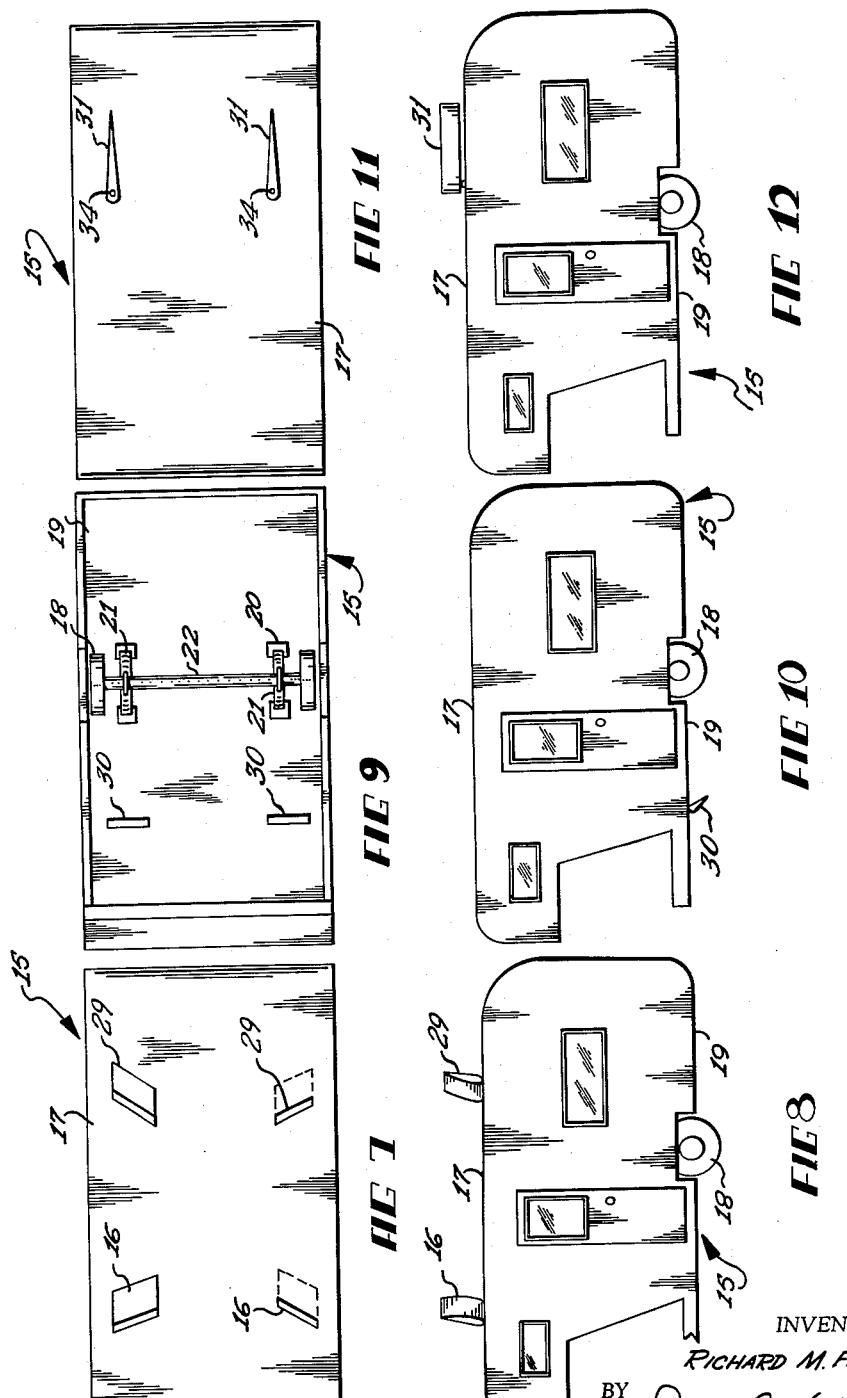

INVENTOR.
RICHARD M. FRANZEL
BY
ATTORNEY

United States Patent Office 3,243,192
Patented Mar. 29, 1966

3,243,192
AUTOMATIC STABILITY CONTROL FOR
GROUND VEHICLES
Richard M. Franzel, Rte. 1, Box 580, Mound, Minn.
Filed Sept. 23, 1963, Ser. No. 310,687
7 Claims. (Cl. 280—29)

This invention relates broadly to automatic stability control means for ground based vehicles; more particularly to towed vehicles such as house trailers and the like; and specifically to sensing and control means to overcome the inherent swerving tendency of such vehicles while in transit. While the invention is particularly well adapted for use in connection with towed vehicles as stated, it will be understood that the principles embodied herein are equally adaptable to the prime mover as well as the said towed vehicle.

It is well known that when a vehicle, particularly trailers, is moved at moderate and high speeds in over the road travel, there is an inherent tendency on the part of the trailed vehicle to swerve from one side of the road or highway and to transmit such swerving action to its prime mover. This condition is generally brought about during travel over uneven road beds, while making turns, the encountering of side or gusty winds, and driving the meeting and passing in close proximity to large vehicles such as trucks and semi-trailers travelling at high speed wherein a vacuum or pressure area is created by the passage of such vehicles.

With the foregoing in mind, the principal object of the invention is to provide automatic sensing and control of such swerving action of a vehicle.

A further object of this invention is to provide automatic sensing and control means for the inherent swerving action of a vehicle by utilizing running gear and suspension.

A still further object of this invention is to provide automatic sensing and control means of the inherent swerving action of a vehicle in transit on roads and highways wherein said control means is initiated and activated by such swerving action which it will detect at the inception of the forces causing the said swerving action and apply counteracting forces.

These and other objects of the invention will become apparent from the following specification and claims when taken in conjunction with the appended drawings which form apart of this application, and in which drawings, like characters indicate like parts, throughout the several views.

To the above end, generally stated, the invention consists of the following devices and combination of devices hereinafter described and defined in the claims.

Referring to the drawings:

FIG. 1 illustrates a top plan view of a conventional trailer type vehicle having a pair of angularly positioned laterally spaced stabilizer sections mounted thereon forwardly of the ground wheels of the vehicle.

FIG. 2 is a side elevational view of the same.

FIG. 3 illustrates a top plan view of a conventional trailer type vehicle having a pair of laterally spaced stabilizer sections mounted thereon in transverse parallel arrangement in line with the ground wheels of the vehicle.

FIG. 4 is a side elevational view of the same.

FIG. 5 is a view similar to FIG. 1 with the exception that the angularly positioned stabilizer sections are mounted rearwardly of the ground wheels of the vehicle.

FIG. 6 is a side elevational view of the same.

FIG. 7 illustrates a top plan view of a conventional trailer type vehicle having two pairs of stabilizer sections angularly mounted thereon, one pair thereof being positioned forwardly of the ground wheels of the said vehicle, and the other pair thereof being positioned rearwardly of said ground wheels.

FIG. 8 is a side elevational view of the same.

FIG. 9 is a bottom plan view of a conventional trailer type vehicle showing the running gear and a pair of laterally spaced stabilizer sections mounted thereon in depending transverse parallel arrangement forwardly of the ground wheels of said vehicle.

FIG. 10 is a side elevational view of the same.

FIG. 11 illustrates a top plan view of a conventional trailer type vehicle having a pair of laterally spaced rudder type stabilizer sections mounted thereon in a position rearwardly of the ground wheels of the vehicle.

FIG. 12 is a side elevational view of the same.

Figure 13:
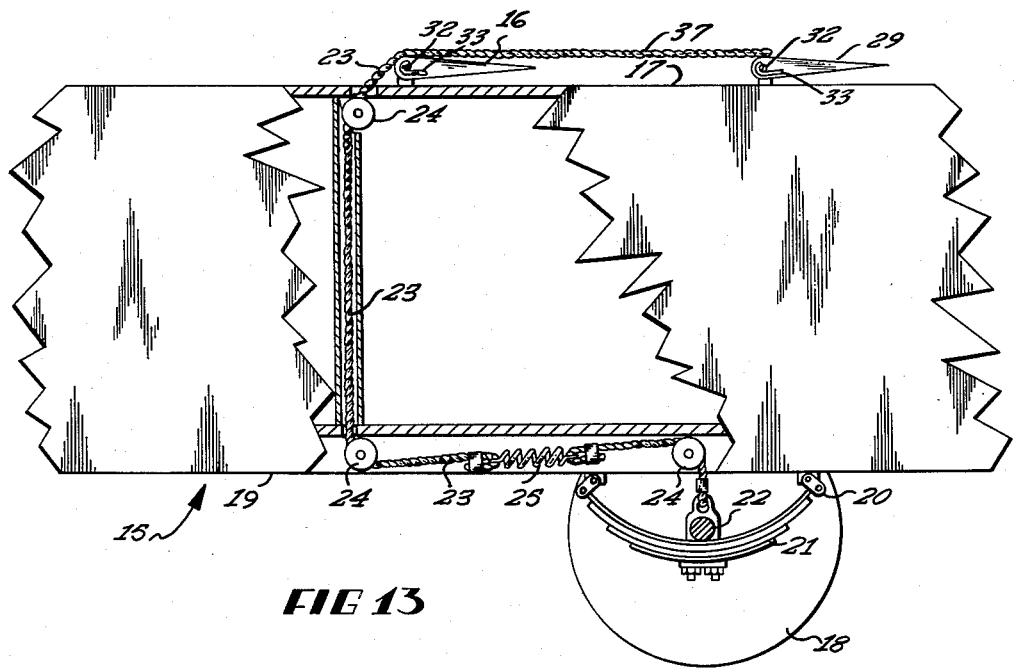
Figure 14:
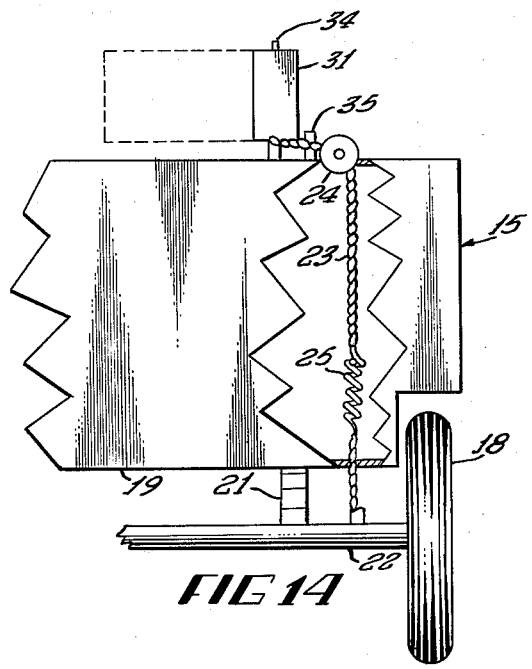
Figure 15:
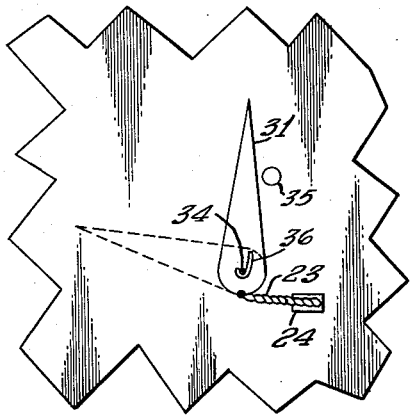

FIG. 13 is an enlarged detailed fragmentary view of a conventional trailer type vehicle in side elevational, some parts being broken away to illustrate one means of stabilizer section control and, FIGS. 14 and 15 are enlarged detailed fragmentary views of a conventional trailer type vehicle, in front elevational and in top elevational respectively, to illustrate one means of rudder-like air-foil stabilizer section control.

Referring now in detail to the several views of the drawings the numeral 15 will hereinafter be used broadly to designate the trailer type vehicle, which as shown, is of the conventional house trailer type.

The drawings illustrate several different embodiments of control means for overcoming the swerving movements of a towed vehicle 15 wherein said control means is in the form of air-foil sections of 16, 28, 29 and 30 pivotally mounted on a horizontally disposed axis 32 as shown in FIGS. 1 through 10 inclusive, and FIG. 13. These air-foil sections 16, 28 and 29 as shown in FIGS. 1 through 8 inclusive, and FIG. 13, are mounted on the roof 17 of the towed vehicle 15 in laterally opposed pairs as will presently appear more in detail. Spring 33 on air-foil sections 16, 28, 29, and 30 hold said air-foil sections in line with air-stream when no swaying or swerving correction is required.

FIGS. 9 and 10 illustrate the air-foil sections 30 mounted beneath the trailed vehicle 15 on a horizontally disposed axis 32 and FIGS. 11 and 12 illustrate a pair of laterally opposed rudder-like air-foil sections 31 mounted for swinging pivotal movements about a vertical axis 34.

FIGS. 1 and 2 illustrate a pair of laterally opposed angularly positioned air-foil sections 16 mounted on the roof 17 of the vehicle 15 forwardly of its ground wheels 18.

FIGS. 3 and 4 illustrate a pair of laterally opposed air-foil sections 28 in parallel arrangement also mounted on the roof 17 of the vehicle 15 in line with its ground wheels 18.

FIGS. 5 and 6 illustrate a pair of laterally opposed angularly positioned air-foil sections 29 mounted on the roof 17 of the vehicle 15 rearwardly of its ground wheels 18.

FIGS. 7 and 8 illustrate two pair of laterally opposed angularly positioned air-foil sections 16 and 29 mounted on the roof 17 of the vehicle 15, one pair 16 thereof being forwardly of its ground wheels 18 and the other pair 29 rearwardly thereof.

FIGS. 9 and 10 illustrate one pair of laterally opposed air-foil sections 30 in parallel arrangement mounted on the underside 19 of the vehicle 15, forwardly of its ground wheels 18.

FIGS. 11 and 12 illustrate a modified form of air-foil sections 31 in the form of a pair of laterally opposed rudder-like sections 31 mounted on the roof 17 of the vehicle 15 for swinging movements about a vertical axis 34, said sections 31 being positioned rearwardly of the ground wheels 18 of the said vehicle 15. In FIGS. 14 and 15 spring 36 holds the rudder-like air-foil section 31 against stop 35 thus keeping said air-foil section 31 in line with the air-stream when no swaying or swerving correction is required.

It will be understood that but a limited number of combination of air-foil sections are illustrated and described herein but in each type, as shown in FIGS. 1 through 10, at least two of such sections 16, 28, 29, and 30 are required, one for each side of the vehicle 15, however, as shown in FIGS. 11 and 12 it would be possible to embody a single centrally mounted section. These section/sections 31 are preferably mounted where shown on the roof 17 of said vehicle in the path of the relatively high velocity of the air-stream caused by the movement of the said vehicle. When the respective air-foil sections 31 are raised or moved to intercept the said air-stream the same will cause a drag to be set up by that air-foil section 31 exposed to the said air-stream and activated by sensor means on the vehicle 15 as will presently appear more in detail. In normal operation the said sensor means activated by the swerving action of the vehicle 15 will in turn activate the proper air-foil section causing a drag by the section activated and thereby counteract the inherent swerving action of the vehicle set up by the forces heretofore described.

As above stated the air-foil sections 16, 28, 29, 30, and 31 are described and illustrated herein as being mounted in opposed pairs on the roof 17 and the underside 19 of the vehicle 15, however, it will be further understood that other locations on the said vehicle may be desirable and the individual placement of the said section on the vehicle in the path of the air-stream may be a variable factor in order to enhance the control effect of the said sections 16, 28, 29, 30, and 31 on the vehicle as initiated by the interception of the said air-stream by the said air-foil sections 16, 28, 29, 30 and 31. Spring 33 (FIG. 13) positions said air-foil sections 16, 28, 29, and 30 in line with the air-stream when no swaying or swerving correction is required.

In FIGS. 1 through 10 inclusive a system has been disclosed wherein the respective air-foil sections are raised into the path of the air-stream pivotally from a horizontal axis 32 relative to the axis of the running gear 20 of the vehicle 15. As shown in FIGS. 11 and 12, one or more vertically disposed rudder-like air-foil section/sections 31 are mounted on the roof 17 of the vehicle 15. These rudder-like sections 31 are normally positioned parallel to the air-stream caused by the movement of the vehicle 15. To counteract the swerving action of the trailer set up by inherent forces, these rudder-like sections may be moved about a vertical axis 34 into the path of the air-stream as initiated by sensor means as will also presently appear in detail.

Sensing means whereby the movement of the respective air-foil sections is initiated may be accomplished by axle or spindle displacement.

The said axle or spindle type of sensor utilizes a conventional wheel suspension comprising semi-elliptical leaf springs or in lieu thereof, coil springs or torsion bars, not shown. In this type of construction it is necessary that the axle 22 or the spindle for each wheel 18 or set of wheels on one side of the vehicle 15 is capable of vertical movement relative to the main body of said vehicle 15 and be at least partially independent of the opposite wheel or wheels 18.

Embodied in this system is a control cable 23 secured at its lower end portion to the axle by suitable means, and thence via a system of pulleys 24 mounted on the frame and body of the vehicle, the said control cable extends to its terminal with the pivotally mounted air-foil sections 16, 28, 29 and 30 on the roof 17 or underside 19 of the vehicle 15, see FIG. 13. A coiled spring 25 is interposed in the control cable 23 between its terminal end portions to afford means whereby said control cable 23 is held taut and is still protected against any excess movement.

It will thus be seen that when a swerving action is encountered by the vehicle 15, the main body portion thereof will sway or swerve from one side to the other and during such movement the distance from the axle or spindle 22 to the said main body portion of the vehicle located above it will increase or decrease according to the direction and magnitude of the force applied by such movement. It will be understood that this varying distance is directly related to the swerving forces applied by the trailed vehicle 15 to its towing vehicle thereby causing the same to "pull" to one side or the other. This movement is transmitted to the air-foil sections 16, 28, 29, 30, and 31 pivotally mounted on the vehicle 15, by the control cable 23.

As shown in FIGS. 1 through 6 and 9 and 10, the said swaying and swerving movement is imparted to the said control cable 23 the changing distance between the terminal ends of said cable will cause the air-foil section 16, 28, 26, or 30 on the same side of the vehicle 15 to which the swaying or swerving force is applied, to be raised on its horizontal pivotal axis into the path of the air-stream thereby counteracting the inherent forces set up by such motion. Conversely, as this motion is partially overcome, but with the initial forces still in effect, and the vehicle still swaying and swerving, the opposite air-foil sections 16, 28, 29, or 30, from that section 16, 28, 29, or 30 first activated, will be raised into the path of the air-stream and alternately again the opposite section 16, 28, 29, or 30 until the said inherent forces are overcome and the vehicle is under control.

It is further understood that placement and area of air-foil sections 16, 28, 29, or 30 can greatly enhance overall operation, the angular placement of the forward and rear said sections as shown in FIGS. 1, 2, 5, 6, 7, and 8 show one arrangement that increases control effectiveness by applying a side force in addition to the drag and downward force. It will be noted that the angular location for said air-foil sections are opposite for said sections on the same side mounted forwardly or rearwardly of ground wheels. In actual operation, refer to FIGS. 1 and 2, when a swerving action raises an angularly located section 16 to approximately ¾ vertical position. There are three correcting forces applied immediately to vehicle 15 tending to force said vehicle in proper position: (1) forward drag, (2) side force, and (3) downward force. It is noted that any one or combination of these forces can be used. FIGS. 3 and 4 show one combination of air-foil section location that does not utilize angular forces.

In FIGS. 7, 8, and 13 which illustrate fore and aft laterally spaced pairs of air-foil sections 16 and 29 pivotally mounted on horizontally disposed axes 32, the one forwardly mounted on air-foil section on the same side of the vehicle to which the swaying or swerving force is applied will be activated and moved into the path of the air-stream and conversely and simultaneously with such movement of the forward air-foil section 16 the said section 29 on the same side of the rearwardly mounted pair of air-foil section will be activated. Cable 37 (FIG. 13) is suitably connected to said air-foil section 16 and to said air-foil section 29 so when said section 16 is raised or lowered, said section 29 will respond in like manner. Thus, both said air-foil sections 16 and 29 on the same side will raise and lower simultaneously when control cable 23 on the same side is activated by a swaying or swerving action in one direction of vehicle 15. Conversely, the opposite air-foil sections 16 and 29 on the same side will be raised into the air-stream when control cable 23 on the opposite side is activated by swaying or swerving of vehicle 15 in the opposite direction and alternately until the swaying and swerving action of vehicle 15 is overcome.

It will be understood that in this disclosure showing two pairs of air-foil sections the positions and arrangements can be varied so the forces applied downward on the front of vehicle 15 when the one forward section 16 is raised can be counterbalanced or varied as desired by simultaneously raising the same rearward section 29, this capability is highly desirable because downward loading applied to the prime-mover by the towed vehicle 15 can be completely controlled during stabilization correction.

In FIGS. 11, 12, 14, and 15 which illustrate the rudder-like air-foil section 31 swingable about a vertically disposed axis 34, the air-foil section 31 on the same side of the vehicle from which the swaying or swerving forces are applied will be swung outwardly into the path of the air-stream. It is possible, however, in this embodiment of the invention to employ only a single air-foil section 31 centrally mounted on the roof of the vehicle, in which case, however, the surface area of the single section would be greater than the surface area of unit of the laterally spaced pair.

While these are herein disclosed but a limited number of embodiments of the structure, process, and product of the invention herein presented, it is possible to produce still other embodiments without departing from the inventive concept herein disclosed, and it is desired, therefore, that only such limitations be imposed on the appended claims as are stated herein or required by the prior art.

What I claim is:

1. Automatic stability control means to overcome the inherent lateral swaying and swerving movements of ground vehicles comprising in combination, a vehicle having a chassis, at least one pair of opposed ground wheels supported by a conventional running gear, a body having a roof, side and end portions, and a bed forming the floor thereof mounted on said chassis, at least one pair of laterally opposed air-foil sections pivotally mounted in a horizontally disposed plane on the roof of said vehicle said air-foil sections being constructed and arranged for alternate raising and lowering movements about the pivotal axis of each thereof into and out of the path of the air-stream created by the movement of the said vehicle, flexible sensor means connecting the said air-foil sections with the running gear of the vehicle whereby one of these said air-foil sections is raised into the path of the air-stream created by movement of the vehicle through atmosphere on the same side of said vehicle from which lateral rocking and swerving movements are applied by inherent forces imposed by air currents and road conditions.

2. The structure of claim 1 wherein at least one pair of air-foil sections are mounted in laterally opposed relation on the roof of the said vehicle, said air-foil section being mounted at their respective forward end portions for alternate raising and lowering pivotal movements about a horizontally disposed axis in the path of the air-stream created by the movement of the vehicle through atmosphere, said air-foil section mounted on the roof of the vehicle being positioned forwardly of the ground wheels of said vehicle.

3. The structure of claim 1 wherein the pivotally mounted laterally opposed air-foil sections are positioned on said vehicle roof rearwardly of its said ground wheels.

4. The structure of claim 1 wherein the pivotally mounted laterally opposed air-foil sections are mounted on the roof of the vehicle in laterally opposed parallel arrangement.

5. The structure of claim 1 wherein the pivotally mounted laterally opposed air-foil sections are mounted on the roof of the vehicle in angular arrangement relative to the longitudinal axis of said vehicle.

6. Automatic stability control means to overcome the inherent lateral swaying and swerving movements of ground vehicles comprising in combination, a vehicle having a chassis, at least one pair of opposed ground wheels supported by a conventional running gear, a body having a roof, side and end portions, and a bed forming the floor thereof mounted on said chassis, at least one pair of laterally opposed air-foil sections pivotally mounted in a horizontally disposed plane on the roof of said vehicle said air-foil sections being constructed and arranged for alternate raising and lowering movements about the pivotal axis of each thereof into and out of the path of the air-stream created by the movement of the said vehicle, a pair of taut flexible cables mounted on opposite sides of said vehicle, said flexible cables being secured at their respective upper end portions to a corresponding air-foil section, and at their respective lower end portions to the corresponding side portions of the running gear of said vehicle, each said flexible cable being constructed to run over a system of sheaves and conduit from its terminal end portion through the body of the vehicle, whereby as the inherent lateral forces imposed by air currents and road conditions cause lateral rocking and swerving action of the vehicle, the flexible cable on the opposite side of the said vehicle from which this lateral force is being imposed will be distended and thereby raise its corresponding air-foil section on its pivotal axis into the path of the air-stream of said vehicle and conversely raise the opposite air-foil section into the path of the air-stream as the inherent lateral forces are imposed on the opposite side of the vehicle, said alternate raising and lowering of the respective air-foil sections continuing automatically by the action of the running gear on the flexible cable until such rocking and swerving action is overcome.

7. Automatic stability control means to overcome the inherent lateral swaying and swerving movements of ground vehicles comprising in combination, a vehicle having a chassis, at least one pair of opposed ground wheels supported by a conventional running gear, a body having a roof, side and end portions, and a bed forming the floor thereof mounted on said chassis, at least one pair of laterally opposed rudder-like air-foil sections pivotally mounted at their respective forward end portions for swinging movements about a vertical axis, and linkage connecting said air-foil sections with the running gear of the vehicle whereby said air-foil sections are alternately activated into swinging movements into and out of the path of the air-stream of the vehicle as the inherent lateral forces imposed by air currents and road conditions cause the vehicle to rock and swerve, the said air-foil section on the same side of the vehicle from that to which the lateral force is imposed by being initially activated.

References Cited by the Examiner

UNITED STATES PATENTS 2,118,127   5/1938   Wulle _____ 105—2 X
2,863,695   12/1958  Stamm _____ 296—1

OTHER REFERENCES

German application Serial No. L 13,425; Ludowici printed Dec. 8, 1955.

LEO FRIAGLIA, *Primary Examiner.*